United States Patent [19]

Suzuki et al.

[11] Patent Number: 5,463,509
[45] Date of Patent: Oct. 31, 1995

[54] DISC CARTRIDGE HOLDER HAVING A SHUTTER CONTROL ARM DISPOSED IN A KEY-HOLE SHAPED APERTURE FORMED IN THE CARTRIDGE HOLDER

[75] Inventors: Yuji Suzuki, Kanagawa; Hirohiko Shimizu, Tokyo; Hiroyuki Suzuki; Kiyoaki Tsuji, both of Kanagawa, all of Japan

[73] Assignee: Sony Corporation, Tokyo, Japan

[21] Appl. No.: 278,075

[22] Filed: Jul. 20, 1994

Related U.S. Application Data

[62] Division of Ser. No. 152,969, Nov. 15, 1993, Pat. No. 5,400,198, which is a continuation of Ser. No. 641,778, Jan. 16, 1991, abandoned.

[30] Foreign Application Priority Data

| Jan. 19, 1990 | [JP] | Japan | 2-3613 U |
| Jan. 19, 1990 | [JP] | Japan | 2-10093 |
| Jan. 19, 1990 | [JP] | Japan | 2-10094 |
| Jan. 20, 1990 | [JP] | Japan | 2-11032 |
| Jan. 31, 1990 | [JP] | Japan | 2-8356 U |

[51] Int. Cl.$^6$ .................................. G11B 17/04
[52] U.S. Cl. ................. 360/99.06; 360/99.02; 369/77.2
[58] Field of Search ............. 360/99.06, 99.02; 369/77.2

[56] References Cited

U.S. PATENT DOCUMENTS

| 4,641,211 | 2/1987 | Okita et al. | 360/99.06 |
| 4,987,506 | 1/1991 | Uehara | 360/99.06 |
| 5,005,092 | 4/1991 | Shigenai et al. | 360/99.06 |

FOREIGN PATENT DOCUMENTS

| 61-009867 | 1/1986 | Japan | 360/99.02 |
| 61-248260 | 11/1986 | Japan | 360/99.06 |
| 63-090059 | 4/1988 | Japan | 360/99.06 |

*Primary Examiner*—Stuart S. Levy
*Assistant Examiner*—Craig A. Renner
*Attorney, Agent, or Firm*—Jay H. Maioli

[57] ABSTRACT

A disc drive includes a cartridge holder formed of a single piece of sheet metal which cooperates with a slide plate which is similarly formed of a single piece of sheet metal. The sides of inclined guide slots formed in side walls of the slide plate are parallel and serve to guide horizontally projecting flange-like guide members of the cartridge holder. A single piece disc shutter control arm is pivotally mounted in the cartridge holder and motivated by the force which moves the disc cartridge into the disc holder in a manner which opens the disc cartridge shutter. The chuck yoke of the turntable is provided with an inertia increasing annular member. A head is mounted on a pivotal head arm which is operatively connected with the cartridge holder in a manner to be pivoted up and down therewith. A head carriage is released and operatively connected with a motor upon the cartridge holder being lowered past the level whereat the disc hub of the disc in the disc cartridge is placed on the chuck yoke and the head is placed on the upper surface of the disc.

2 Claims, 11 Drawing Sheets

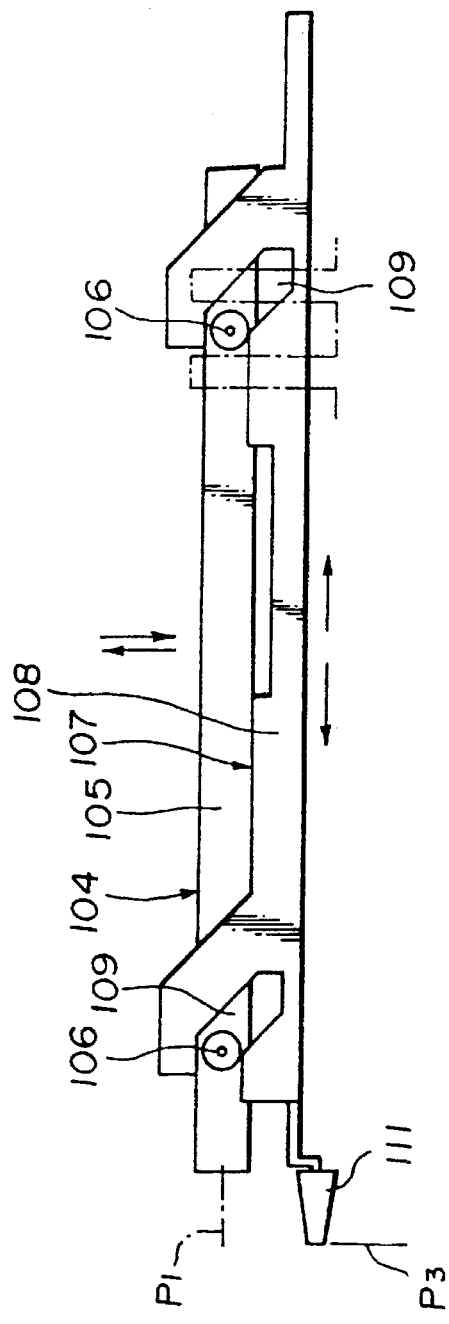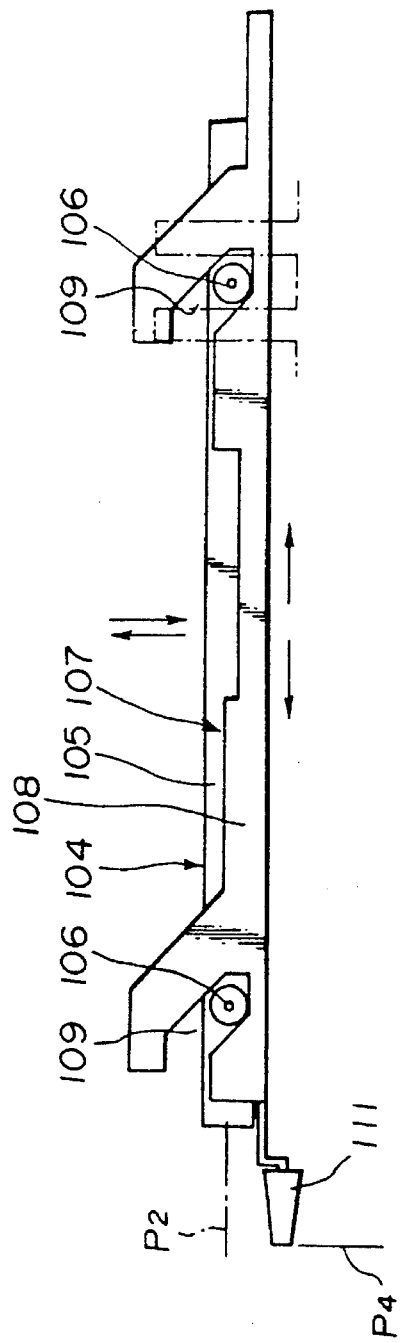

DISC CARTRIDGE HOLDER HAVING A SHUTTER CONTROL ARM DISPOSED IN A KEY-HOLE SHAPED APERTURE FORMED IN THE CARTRIDGE HOLDER

This is a division of application Ser. No. 08/152,969, filed Nov. 15, 1993, now U.S. Pat. No. 5,400,198, issued on Mar. 21, 1995, which is a continuation application of Ser. No. 07/641,778, filed Jan. 16, 1991, now abandoned.

BACKGROUND OF THE INVENTION

1. Field of the Invention

The present invention relates generally to disc drives and more specifically to a mechanism for raising and lowering a disc cartridge holder between a position in which a disc cartridge can be inserted into the holder and a fully loaded position wherein the disc cartridge is placed in an operative position on a turntable and which features the use of inclined guide means for achieving the above mentioned holder movement.

2. Description of the Prior Art

FIGS. 10 and 11 show a prior art mechanism used to raise and lower a disc drive cartridge holder 104 between insertion and fully loaded positions P1 and P2. In this mechanism guide members 106, 106 are arranged on the side edges 105 of the holder proximate the forward and rear ends thereof. A slide plate 107 has vertically extending side walls 108 in which guide slots 109, 109 are formed. The slide plate 107 is arranged to be movable in the fore and aft directions between positions P3 and P4. During the movement from position P3 to P4 the guide members 106 enter the guide slots 109 and the cartridge holder is drawn down from the insertion level P1 to an operative level P2. Conversely, when the slide plate 107 undergoes a P4 to P3 change in position, the cartridge holder is moved upwardly from position P2 to P1.

It should be noted that an eject button 111 is operatively connected with the chassis of the slide plate 107 in order to enable the manual movement of the cartridge holder 104 from the fully loaded position to the insertion or loading one.

Normally, in order to permit the disc to be placed in a drive condition relative to the turntable, the disc 112 is provided, as shown in FIG. 13, with a plamag (ferrite filled plastic material) or the like type of disc hub 113 which can seat on a chuck yoke 114 of approximately the same size. In this instance the chuck yoke 114 is rotatably supported on a shaft 115 and provided with an offset drive pin 116. The disc hub 112 is formed with apertures 117 and 118 which respectively receive the upper end of the shaft 115 and the drive pin 116.

This arrangement enables the disc to be driven synchronously with the chuck yoke 114.

The turntable drive arrangement is such that the shaft 115 is placed in direct drive connection with a spindle motor and the former is operatively connected with the chuck yoke 114 by way of a belt or the like.

However, with this prior art, the mechanism for raising and lowering the cartridge holder is usually arranged such that the guide members take the form of guide rollers. However, this type of construction induces the following drawbacks.

(1) Because guide rollers are used, the number of moving parts is increased and the amount of machining and the like, which is inherently required to rotatably mount the rollers, increases the cost of the device.

(2) As shown in FIG. 12, when the holder is in the cartridge insertion or loading position the axis of each roller is located in the position denoted by $O_1$, while when in the loaded or operative position, the axis is located in the $O_2$ position. Thus, if the stroke of the slide plate 107 is X and the amount of vertical displacement of the cartridge holder is Y, then the $O_1O_2$ angle is given by $\theta_1 = \tan^{-1} Y/X$ and, in order to use the rollers, the guide slots 106 must be formed at an angle $\theta_2$ which is greater than $\theta_1$. As a result, when it is desired to eject a disc an undesirably high pressure must be applied to the eject button 111. This of course deteriorates the operational characteristics undesirably.

SUMMARY OF THE INVENTION

It is an object of the present invention to provide a disc drive which overcomes the above mentioned drawbacks and which further is readily manufacturable and compact in construction.

In brief, the above object is achieved by a disc drive arrangement which features a cartridge holder formed of a single piece of sheet metal which cooperates with a slide plate which is similarly formed of a single piece of sheet metal. The sides of inclined guide slots formed in side walls of the slide plate are parallel and serve to guide horizontally projecting flange-like guide members of the cartridge holder. A single piece disc shutter control arm is pivotally mounted in the cartridge holder and motivated by the force which moves the disc cartridge into the disc holder in a manner which opens the disc cartridge shutter. The chuck yoke of the turntable is provided with an inertia increasing annular member. A head is mounted on a pivotal head arm which is operatively connected with the cartridge holder in a manner to be pivoted up and down therewith. A head carriage is released and operatively connected with a motor upon the cartridge holder being lowered past the level whereat the disc hub of the disc in the disc cartridge is placed on the chuck yoke and the head is placed on the upper surface of the disc.

More specifically, a first aspect of the invention provides a disc drive which features: a chassis; a reciprocal slide plate which is slidably mounted on said chassis, said slide plate being formed with a guide slot which is inclined at a predetermined angle with respect to said chassis; and a cartridge holder into which a disc cartridge can be inserted, said cartridge holder being formed from a single piece of sheet metal and having a flange-like projection which extends laterally outward from the cartridge holder, the flange-like projection being slidably received in the guide slot in a manner wherein, when said slide plate is displaced horizontally with respect to the chassis, said cartridge holder is displaced vertically.

A second aspect of the present invention comprises a disc drive which features: a cartridge holder into which a disc cartridge can be inserted; means operatively interconnecting said cartridge bolder with a chassis for selectively raising and lowering the disc cartridge with respect to the chassis; and a shutter control arm disposed in said cartridge holder, said shutter control arm having a portion which is receivable in a recess formed in the leading edge of a disc cartridge which is inserted into the cartridge holder, said shutter control arm being arranged to respond to the force which is applied thereto by said disc cartridge to move in a manner which opens a shutter which is slidably mounted on the disc cartridge.

Another feature of the present invention provides that the above mentioned shutter control arm is pivotally mounted on said cartridge holder so as to be pivotal about an axis, said shutter control arm being integrally formed as a single piece.

A further aspect of the present invention provides a disc drive which features: a turntable arrangement which comprises: a chuck yoke; and an annular inertia increasing element connected to the outer periphery of the chuck yoke.

Another aspect of the present invention provides that the inertia increasing element has motor servo pulse PG detection means defined thereon.

An additional aspect of the present invention provides a disc drive which features: a cartridge holder into which a disc cartridge can be inserted; means operatively interconnecting said cartridge holder with a chassis for selectively raising and lowering the disc cartridge with respect to the chassis; a printed circuit board disposed in said drive at a location above the position assumed by said cartridge holder when it is raised to a predetermined position above the chassis; and a pivotal head arm having a head supported on the free end thereof, the free end of said head arm being pivotal to a height which is greater than said printed circuit board.

Yet another aspect of the present invention provides a disc drive which features: a cartridge holder into which a disc cartridge can be inserted, said cartridge holder being movable between a first position in which a disc can be inserted and a second position in which a disc cartridge in the cartridge holder is placed in an operative condition, said cartridge holder being formed of a single piece of sheet metal and having a side wall from which a guide member projects; and a chassis on which said cartridge holder is movably supported, said chassis having a side wall including guide means which cooperates with the guide projection of the cartridge holder in a manner which causes the cartridge holder to move vertically with respect to the chassis between the first and second positions.

BRIEF DESCRIPTION OF THE DRAWINGS

FIGS. 10 and 11 show the prior art cartridge holder shifting mechanism discussed in the opening paragraphs of the instant disclosure;

DETAILED DESCRIPTION OF THE PREFERRED EMBODIMENTS

Figure 1:
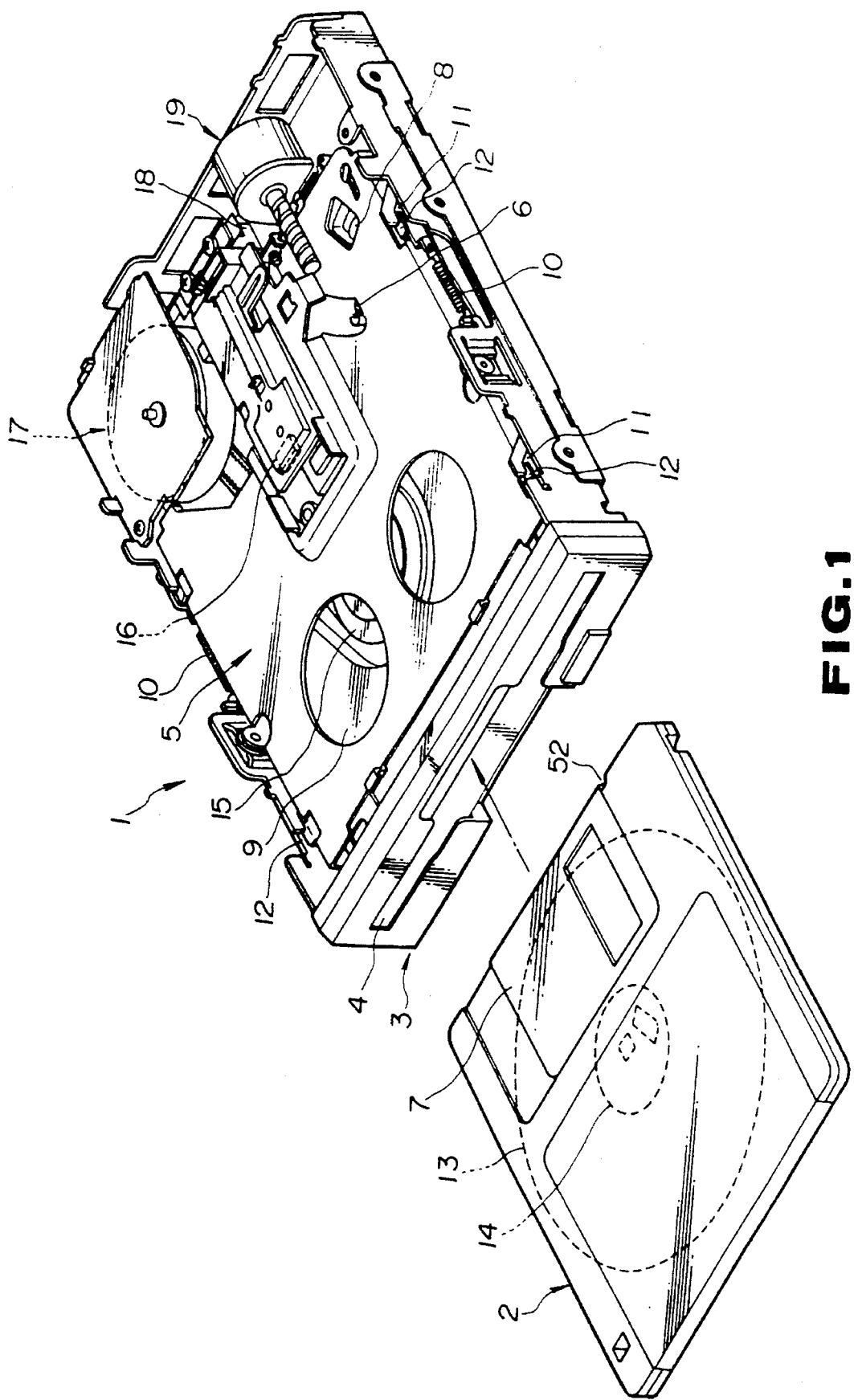
FIG. 1 is a perspective view showing the construction of a disc drive to which the present invention is applied.
Figure 2:
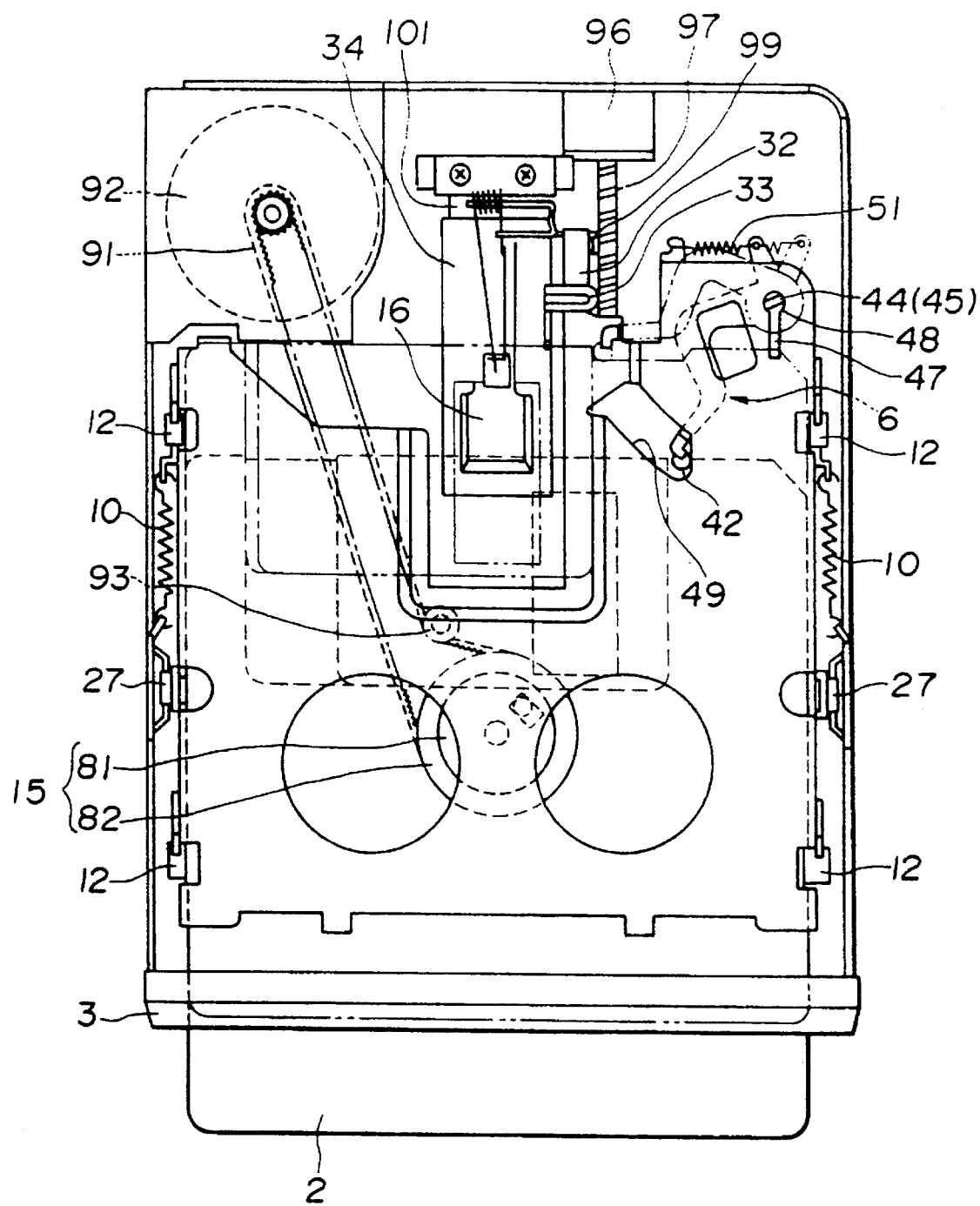
FIG. 2 is a plan view of the arrangement shown in FIG. 1.
Figure 3:
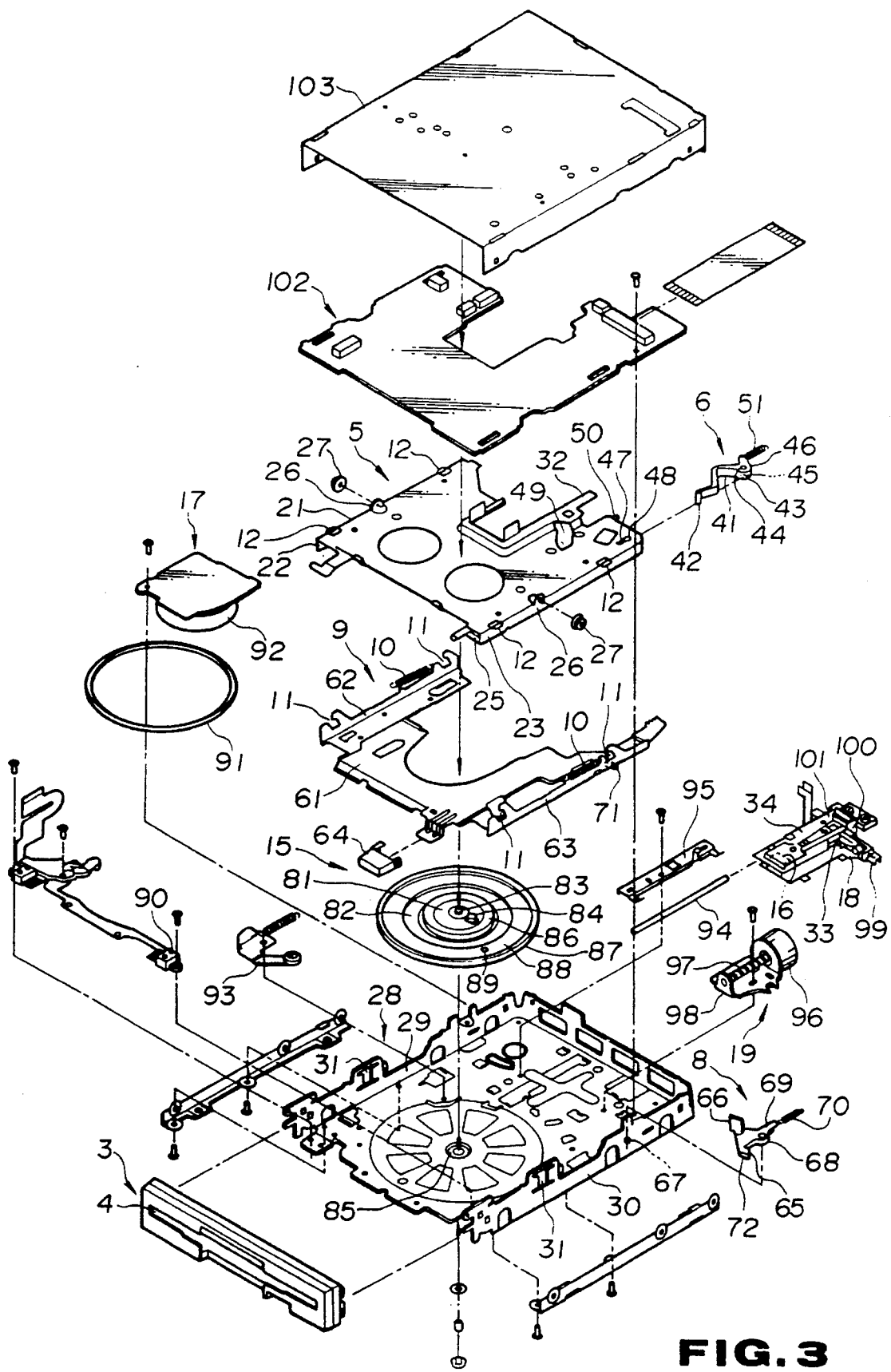
FIG. 3 is an exploded view showing the various components which comprise the disc drive shown in FIGS. 1 and 2.

FIG. 1 is a perspective view of a disc drive 1 on which a printed circuit board is mounted and to which the embodiments of the present invention are applied. FIGS. 2 and 3 show the same disc drive in plan and exploded view form. More specifically, FIG. 1 shows a disc cartridge 2 which is oriented for insertion into a cartridge insertion opening 4 formed in the front panel 3. A cartridge holder 5 is located within the disc drive and arranged to receive the cartridge upon insertion. Upon insertion of the disc cartridge 2 into the cartridge holder 5, a shutter control arm 6 rotates in a manner to open a shutter 7 and the leading edge of the cartridge engages a disc lock lever 8. The movement of the lock lever 8 unlocks a slide plate 9 which moves under the bias of slide plate return springs 10 in a direction which induces the cartridge holder to move toward a loading direction.

Each side of the slide plate is formed with guide slots 11, 11 which are arranged to cooperate with guide projections 12, 12 formed on the cartridge holder 5 in a manner which guides the latter downwardly in a manner wherein the hub 14 of the disc 13 enclosed within the disc cartridge 2 is caused to seat sit on a turntable 15 rotatably supported on a chassis 28 of the disc drive. A disc head 16 is supported proximate the turntable 15.

As the turntable 15 is rotated by a disc drive mechanism 17, a carriage mechanism 18 on which the head 16 is supported, is driven by a carriage drive mechanism 19, in a direction which is aligned with a radius of the disc 13.

CARTRIDGE HOLDER VERTICAL DISPLACEMENT MECHANISMS

Figure 4:
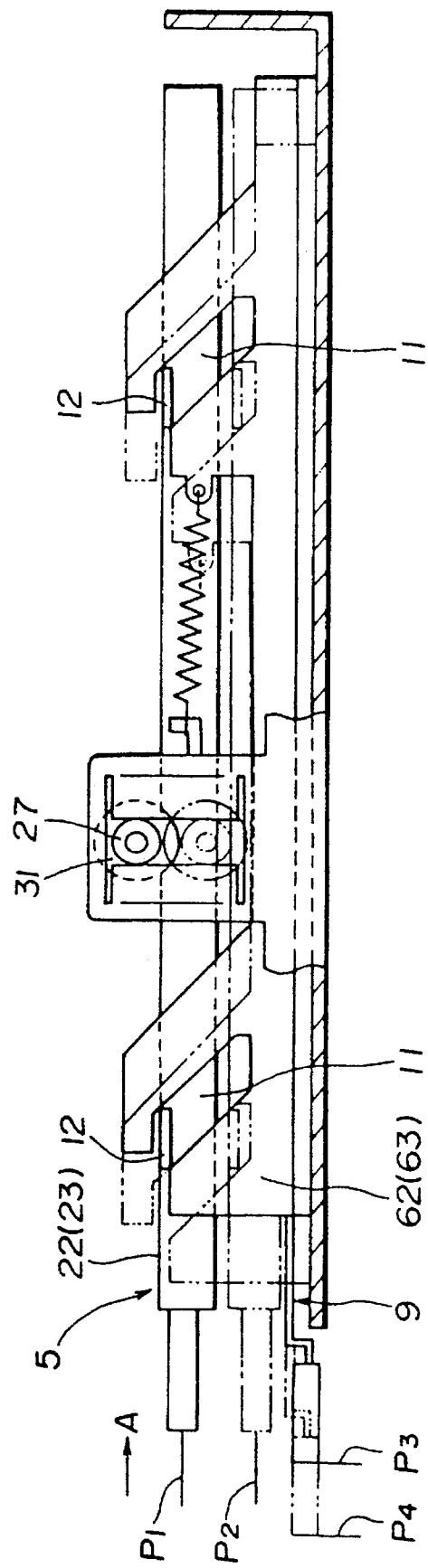
FIG. 4 is a side elevation showing the construction which characterizes a first embodiment of the present invention.

FIG. 4 shows details of the mechanism which enables the cartridge holder to be vertically displaced between insertion and fully loaded positions P1 and P2. When the cartridge is inserted in the direction indicated by arrow A, the guide projections 12, 12 which extend laterally from side walls 22, 23 of the cartridge holder at positions proximate the forward and rear ends of the same, engage in inclined guide slots 11, 11 which are formed in upwardly extending side walls 62, 63 of the horizontally reciprocal slide plate 9.

when the slide plate 9 assumes the position denoted by P3, the guide projections 12, 12 located the upper ends of the inclined guide slots and the cartridge holder 5 are induced to assume the insertion level P1. On the other hand, when the slide plate 9 moves toward the front of the drive and assumes the position illustrated in phantom and denoted by P4, the guide projections 12, 12 are induced to slide down toward the bottom of the inclined guide slots 11, 11 in a manner wherein the cartridge holder is vertically displaced downwardly to the level denoted by P2.

In this embodiment the guide projections 12, 12 are formed on the cartridge holder 5 by press forming a sheet metal plate in a manner wherein the guides 12, 12 are defined by suitably perforating the plate and then bending the same through 180° so as to extend laterally outward from the upper shoulder of the finished element (see FIG. 3). As will also be appreciated from FIG. 3, the inclined guide slots can be formed by press working sheet metal.

Figure 5:
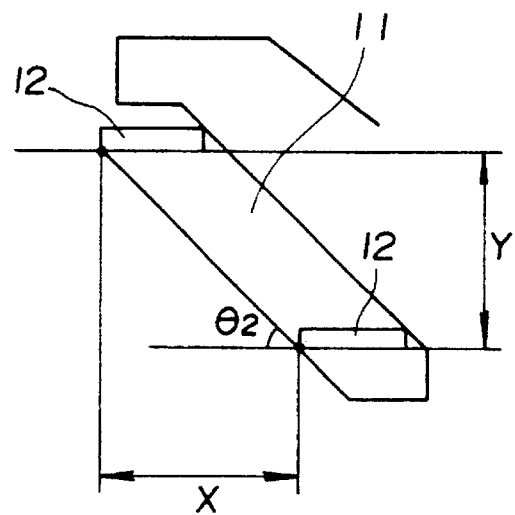
FIG. 5 is a schematic diagram depicting the operation of the first embodiment of the present invention.

As will be appreciated from FIG. 5 the angle of inclination of both edges of the guide slots 11, 11 can be set at $\tan^{-1}Y/X$.

Further, due to the manner in which the guide projections 12, 12 and the guide slots 11, 11 are formed any burring which tends to occur extends normally to the edges of the elements which define the same and does not interfere with the smooth sliding of the projections along the slots.

CARTRIDGE HOLDER CONSTRUCTION

As best appreciated from FIG. 3, the cartridge holder 5 consists of a piece of sheet metal which has been press worked to define a main upper horizontal surface 21 and downwardly extending side walls (left and right) 22, 23 which depend from the sides of the upper surface 21. The free ends of the side walls 22 and 23 have been further bent inwardly to define lower support surfaces which support the disc cartridge. Further, by selective punching and bending portions of the upper surface immediately adjacent the shoulder defined between the upper surface 21 and the side walls 22, 23, the guide projections 12, 12 can be formed at suitable fore and aft locations. Roller support members 26 on which rollers 27 are rotatably supported, are formed in a similar manner to the guide projections 12, 12 at locations between said guide members.

The above mentioned rollers 27 are arranged to be received in vertically extending guide apertures 31 formed in upwardly extending side walls 29, 30 which constitute part of the chassis 28. This arrangement accordingly prevents the movement of the disc cartridge in the fore and aft directions and limits the movement to vertical displacement. As a result, the guide slots 11, 11 function as cam grooves which as the slide plate 9 reciprocates back and forth induces the cartridge holder 5 to undergo vertical displacement.

when the cartridge holder 5 is moved upwardly, a head drive element 32 which is formed on the upper surface 21 of the holder 5 induces the head support arm 34 to pivot upwardly through a holder engagement portion 33. This causes the head 16 which is supported on the lower surface of the free end of the arm 34 to assume an unloading position (see FIG. 16).

On the other hand, when the cartridge holder 5 is lowered, the head arm 34 pivots downwardly therewith. When the disc 13 sits on the turntable 15 the head 16 engages the upper surface of the disc. As the head cannot move any further in the downward direction, as the cartridge holder 5 continues to descend, the head drive element 32 which is formed on the upper surface 21 of the holder 5 assumes a condition wherein the holder engagement portion 33 is brought out of engagement with the holder 5 and the engagement resistance between the two element is negated. Under these conditions, the head 16 is rendered movable under the control of the head carriage 18.

Figure 4A:
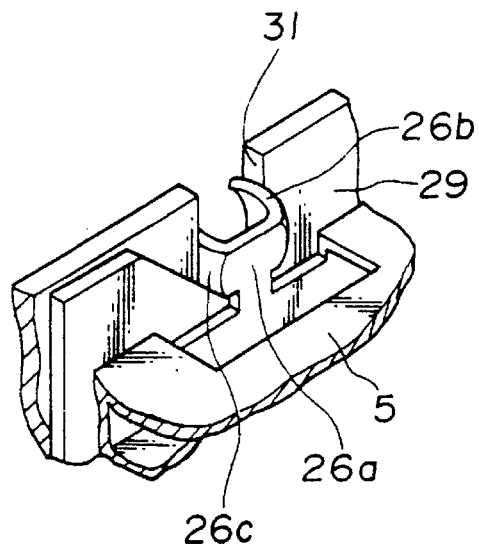
FIGS. 4a and 4b are views showing constructional details of the arrangement shown in FIG. 4.
Figure 4B:
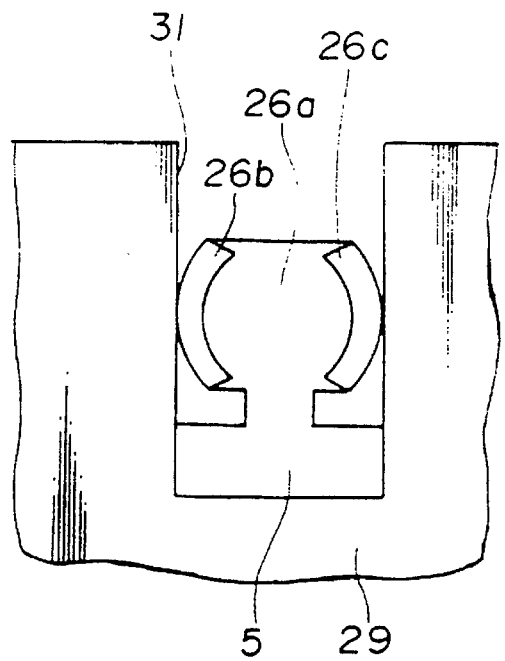

It will be noted that as an alternative to the use of the rollers 27, it is possible to press form the support members 26 to have a base portion 26a and curved outwardly extending flange portions 26b and 26c. A shown in FIGS. 4a and 4b, the curved flange portions 26b and 26c engage the edges of the guide apertures 31 formed in upwardly extending side walls 29, 30 of the chassis 28. As will be appreciated, with this arrangement, the construction of the cartridge holder 5 is further simplified in a manner which reduces both the number of moving parts and the number of operations which are required to assemble the same.

SLIDE PLATE CONSTRUCTION

As will be appreciated from the above description, the slide plate 9 is slidably mounted on the disc drive chassis 28 and is an element of the inventive disc drive which is essential for moving the cartridge holder to and from the position in which a cartridge can be inserted, that is, a position in which cartridge loading and unloading can be carried out. More specifically, loading refers to the situation wherein the cartridge is inserted into the holder, while unloading refers to the situation wherein the cartridge is moved out of the holder in an eject direction.

Slide plate return springs 10 are arranged to bias the slide plate 9 toward a "loaded" position (viz., a position which the cartridge holder assumes when the disc is placed in operative connection with the turntable 15).

As shown in FIG. 3, the sheet metal base portion 61 has upwardly extending side walls 62, 63. The forward and rear portions of these side walls are formed with the above mentioned inclined guide slots 11, 11. In this embodiment, these guide slots are arranged to incline toward the front of the disc drive.

The slide plate return springs 10 are arranged to normally bias the slide plate 9 toward the front of the disc drive and thus to a position which induces the cartridge holder 5 to assume the above mentioned loaded position.

when the eject button 64 provided at the front of the slide plate 9 is pressed, the slide plate 9 is moved toward the rear of the disc drive against the bias of the slide plate return springs 10 and in a manner which tends to bring the cartridge holder 5 up to the loading/unloading position.

when the slide plate reaches the position wherein the cartridge holder assumes the just mentioned loading/unloading position, the disc lock lever 8 assumes a state wherein a pawl portion 65 engages a projection on the slide plate 9 and locks the same against movement under the bias of the return springs 10.

while the cartridge holder 5 is thus secured in the loading/unloading position, as a disc cartridge is inserted, the shutter 7 on the cartridge is opened by the shutter control arm 6. Further, during the insertion the leading edge of the cartridge engages a projection 66 formed on the lock lever 8. As a result, the lock lever 8 rotates about a vertical shaft 67 via which it is pivotally mounted on the chassis. This rotation moves the pawl portion 65 out of engagement with the slide plate 9 in a manner which unlocks the slide plate and renders the same movable under the bias of the return springs 10.

As the slide plate 9 moves under the bias of the return springs 10, the guide projections 12, 12 slide down along the guide slots 11, 11 in a manner which induces the cartridge holder 5 to undergo vertically downward displacement.

It should be noted that the shaft 67 via which the slide plate lock lever 8 is pivotally supported on the chassis 28 passes through a portion 68 of lock lever, and that the pawl portion 65 and the projection 66 and a spring connection portion 69 via which coil spring 70 interconnects the lock lever with the chassis 28, are arranged so that pawl portion 65 and the spring connection portion are located on diametrically opposite sides of the pivot shaft 67 and the projection 66 is located on a line which intersects the line interconnecting the stopper and spring connection portions at 90°. It should be also noted that the pawl portion 65 is arranged to engage the front surface of a downwardly extending flange member 71 on the underside of the slide plate 9.

In more detail, as the slide plate is moved rearwardly toward the position in which the cartridge holder 5 is moved into the loading/unloading position, the downwardly extending flange member 71 engages the front edge 72 of the pawl portion 65 in a manner which induces the lock lever 8 to rotate clockwise against the bias of the spring 70 in a lock releasing direction. When the pressure which is applied via the flange 71 is released the spring 70 induces the lever 8 to engage the flange in a manner which prevents the slide plate 9 from moving forward under the influence of the return springs 10.

With the slide plate retained in this manner, when a disc cartridge 2 is inserted into the cartridge holder 5, as mentioned above, the leading edge of the disc cartridge 2 engages the projection 66 on the lock lever 8 inducing the same to rotate against the bias of the spring 70 and in a manner wherein the pawl portion 65 is moved out of communication with the flange 71 in manner which dissolves the locking action and renders the slide plate movable under the influence of the return springs 10.

SHUTTER CONTROL ARM CONSTRUCTION

Figure 6:
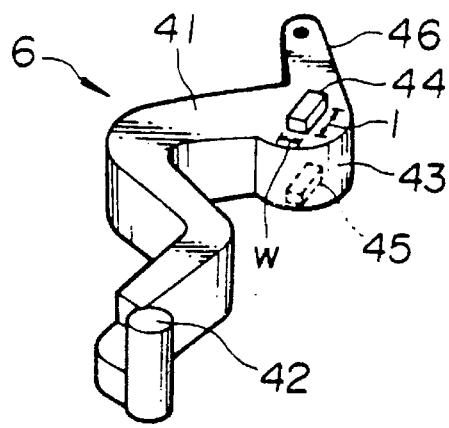
FIG. 6 is a perspective view showing a shutter operating arm according to a second embodiment of the present invention.

As shown in FIG. 6 the shutter control arm 6 which is formed of plastic, which has an essentially S shaped configuration and which includes a main arm portion 41 and a shutter engaging member 42 formed at one end thereof. A mounting portion 43 is formed at the other end of the arm portion 41. The upper and lower surfaces of this portion 43 are formed with rectangular projections 44, 45 which function as shafts about which the arm is pivotal. A spring connection portion 46 extends from the mounting portion 43 in the illustrated manner.

In this arrangement the arm portion 41, mounting portion 43 and spring connection portion all have a thickness which is slightly less than the clearance defined between the upper and lower surfaces 21, 25 of the cartridge holder 5. On the other hand, the length of the shutter engaging member 42 and the distance defined between the upper surfaces of the rectangular projections 44, 45 are slightly larger than the clearance between the above mentioned upper and lower surfaces of the cartridge holder 5. Further, the rectangular projections 44, 45 are formed such that they have their longer dimensions (lengths 1) oriented toward the shutter engaging portion 42.

Figure 7:
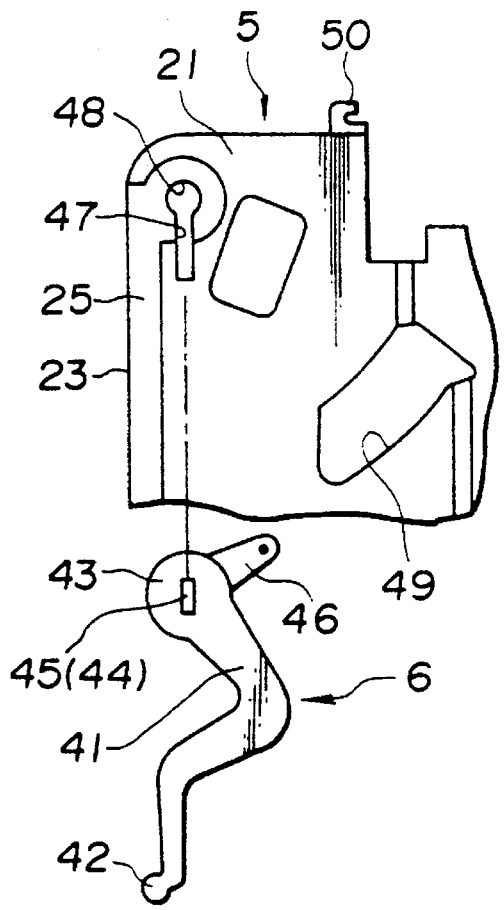
FIGS. 7 and 8 show the shutter operating arm of FIG. 6 in an operative disposition.
Figure 9:
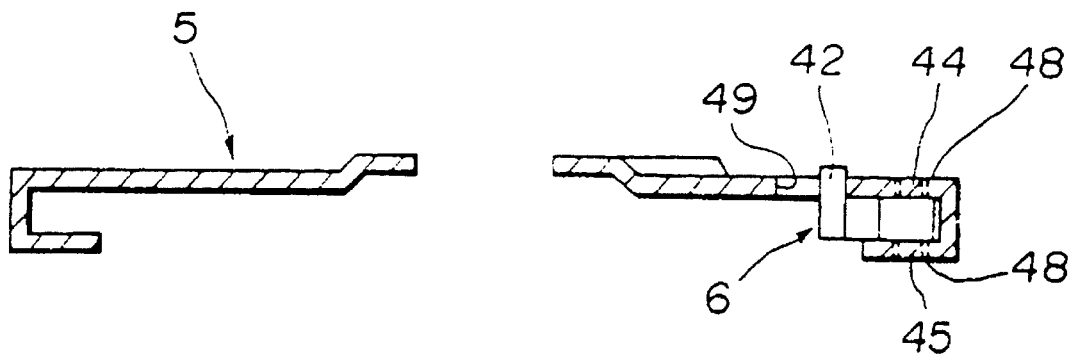
FIG. 9 is a sectional view showing the manner in which the shutter operating arm is mounted.
Figure 12:
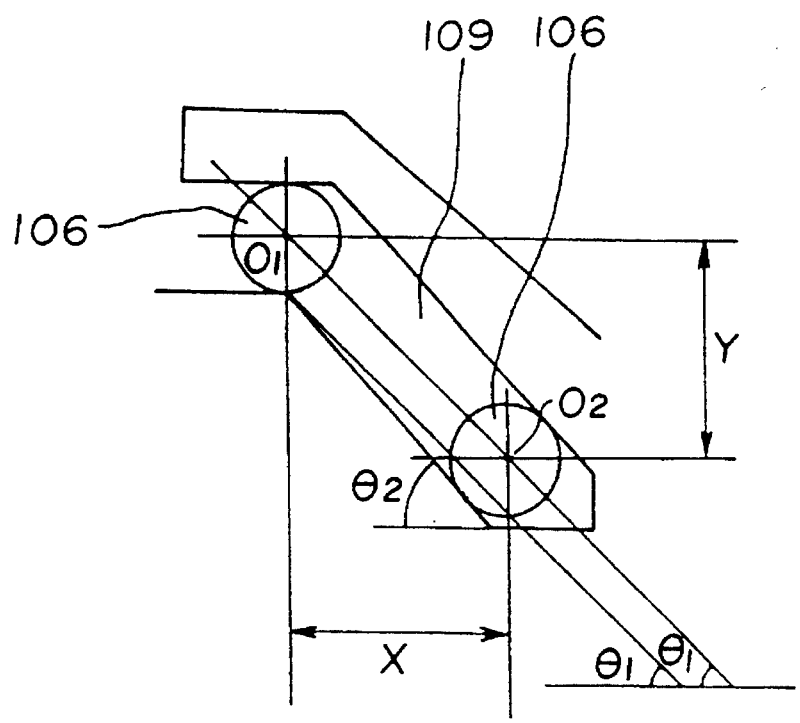
FIG. 12 is a schematic elevation demonstrating the angles which induce the prior art drawback.
Figure 13:
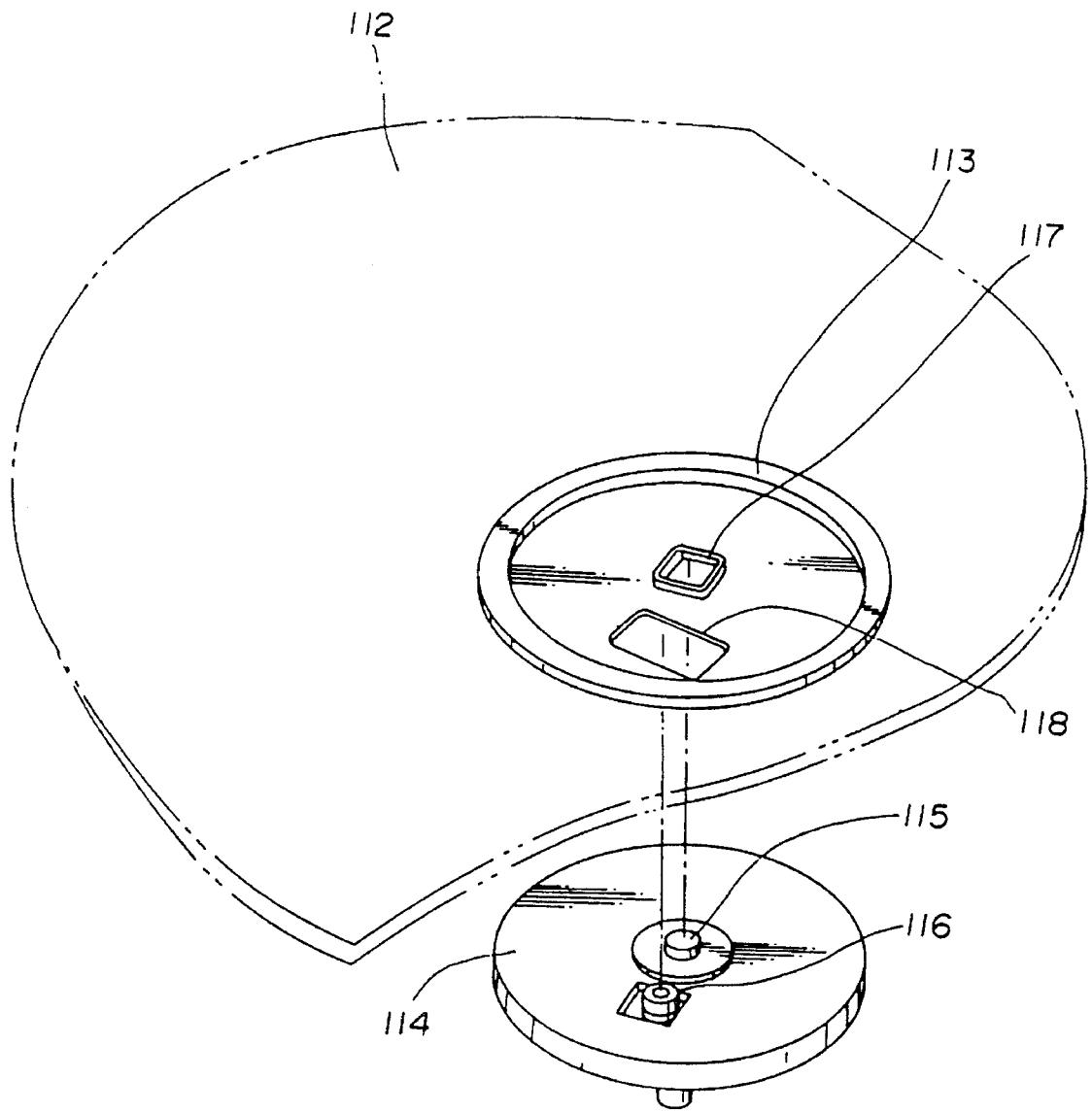
FIG. 13 is a perspective view of a prior art type disc and chuck yoke arrangement discussed in the opening paragraphs of the instant disclosure.

Further, as shown in FIGS. 7 and 9 the shutter control arm 6 and the cartridge holder 5 are formed in such a manner that when assembled the top surfaces of the pivot shaft members 44, 45 lie flush with the upper and lower surfaces of the upper and lower surfaces 21, 25 of the cartridge holder 5. The upper and lower surfaces 21, 25 of the cartridge holder 5 are each formed with a keyhole-shaped aperture 47. The diameter of the circular portion 48 of this aperture is arranged to be slightly greater than the length 1 of the rectangular projections 44, 45 while the straight slot portion has a width slightly greater than the width dimension w of said projections. The upper surface 21 is formed with an opening 49 through which the upper portion of the shutter engaging member 42 can project and which is shaped to permit the arm 6 to be rotated through a predetermined angle.

Figure 8:
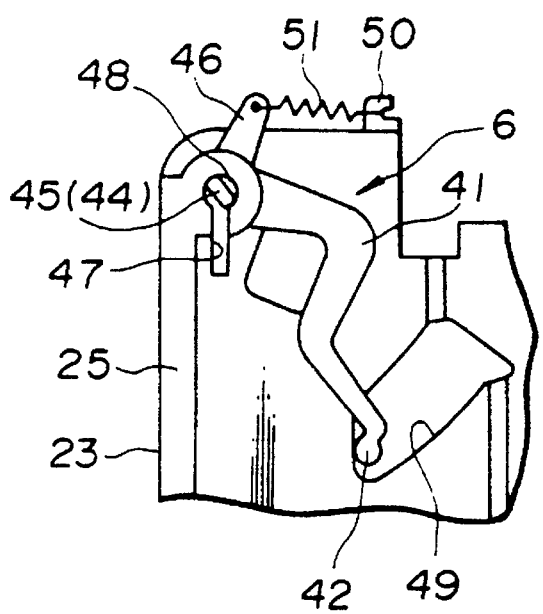

It will be noted that the angle at which the straight slot portion of the keyhole-shaped aperture 47 is formed is such that after the arm 6 has been inserted, slid into place and rotated to the position shown in FIG. 8, the rectangular projections 44, 45 are angled with respect to the straight slot portion in a manner which prevents the same from coming out.

A coil spring 51 is connected between the spring connection portion 46 and a spring correction lug 50 formed on an edge of cartridge holder 5. This spring 51 is such as to bias the arm 6 to the position illustrated in FIG. 8.

When a disc cartridge 2 is inserted into the cartridge holder 5, the pin-shaped shutter engaging member 42 engages in a pin receiving recess 52 formed in the leading edge of the disc cartridge 2. As the disc cartridge 2 continues to be inserted into the cartridge holder 5, the arm 6 is induced by the engagement between the engaging member 42 and the recess 52 to rotate about the rectangular projections 44, 45 (pivot shafts) and to draw the shutter 7 to an open position.

The above described shutter control arm 6 provides the following advantages:

(1) The arm is disposed and supported within the cartridge holder.
(2) The external periphery of the cartridge holder 5, in particular the upper surface can be configured in a manner which provides space for the provision of a printed circuit board above the same.
(3) The shutter control arm 6 is formed of a single integral element and thus simpler than the arrangements used in prior art type disc drive units and can be readily manufactured and installed.
(4) The use of rectangular projections as pivot shafts enables the use of simply shaped apertures in the upper and lower surfaces of the cartridge holder, and facilitates ready installation.

TURNTABLE CONSTRUCTION

Figure 14:
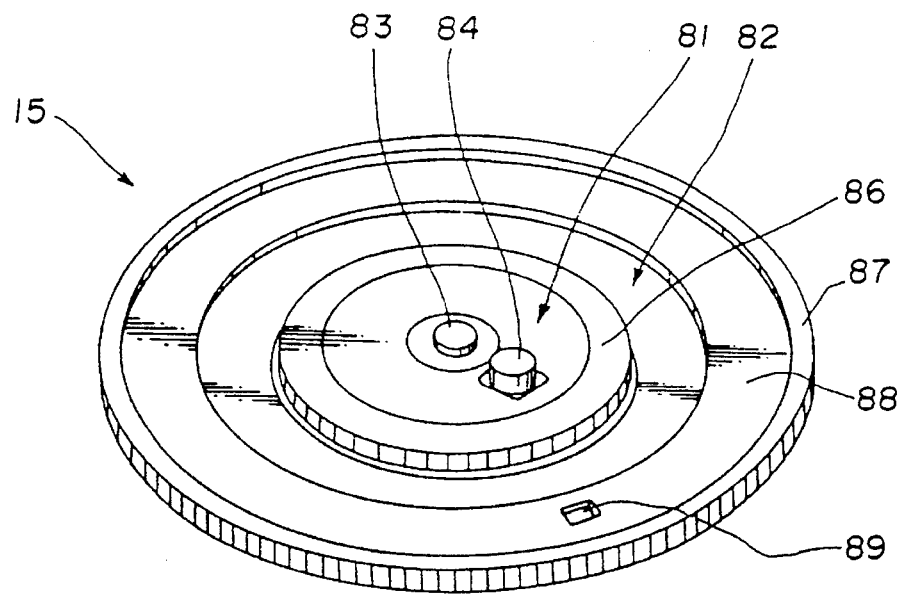
FIG. 14 is a perspective view showing details of a turntable used in the present invention.
Figure 15:
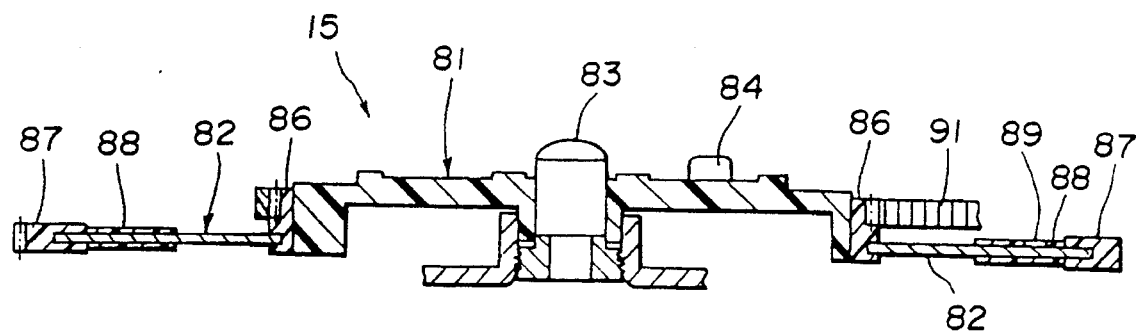
FIG. 15 is a sectional elevation of the turntable shown in FIG. 14.

As shown in FIGS. 3, 14 and 15, the turntable 15 comprises a chuck yoke 81 and an inertia increasing annular plate member 82 disposed about the external periphery of the yoke 81.

As mentioned above, the chuck yoke 81 is formed of a ferrite containing magnetic plastic. A rotation shaft or spindle 83 is disposed through the center of the chuck yoke 81 while an eccentric drive pin 84 is disposed at a predetermined radial distance from the spindle 83. A spindle receiving aperture 85 is formed in the chassis 28.

After the disc cartridge 2 has been inserted into the cartridge holder 5 and is lowered toward the loaded position, the disc hub 14 sits on the chuck yoke 81. Shortly after this the drive pin 84 which projects up above the surface of the chuck yoke 81 engages in a suitable aperture formed in the disc hub 14, and a drive connection between the turntable and the disc is established.

The inertia increasing annular plate 82 is formed of sheet metal. The inner and external peripheries of this plate are provided with plastic ring members 86 and 87. The inner ring 86 is press fitted onto the external periphery of the chuck yoke 81 in the manner shown in FIG. 15 so as to be synchronously rotatable therewith.

The external surface of the inner ring member 86 is formed with gear teeth or cogs. A plastic sheet 88 is provided on the upper and lower surfaces of a selected outer peripheral portion of the annular plate 82. An opening is formed in the upper sheet so as to expose a portion of the metallic plate 82 in a manner which defines a PG detection site 89 which is adapted to cooperate with a PG sensor 90.

It is possible to selectively vary the size and mass of the inertia increasing annular plate 82 in accordance with varying jitter and motor torque specifications.

It should be noted that the PG sensor site 89 can be replaced with any other suitable cut-out or like type of arrangement if so desired.

The gearing formed on the external periphery of the inner ring member 86 is arranged to cooperate with a geared or cogged belt 91 which establishes a drive connection between the turntable 15 and a drive motor 92. A tension lever 93 engages the outer periphery of the belt 91 in the manner illustrated in FIG. 2.

The external ring member 87 is also formed with gear teeth which cooperate with a non-illustrated auto-eject mechanism.

The above described turntable construction provides the following advantages:

(1) The provision of the inertia increasing ring construction increases the inertia of the turntable and attenuates the generation of jitter.

(2) In accordance with given jitter specifications and motor torque requirements the mass of the inertia increasing ring arrangement can be readily modified.

(3) A simple chuck yoke construction is rendered possible.

(4) It is possible to use the members which are secured to the external periphery of the chuck yoke 81 to define a PG sensor site, such as by providing a cut out portion in which a seal or the like can be disposed and used to vary the reflection efficiency of the site.

HEAD CARRIAGE/CARRIAGE DRIVE MECHANISM, ETC.

The head carriage 18 is slidably supported on a guide shaft 94 which is in turn supported on the chassis 28 by a guide shaft holder 95. Accordingly, the head carriage is movable by way of the guide shaft 94 radially over the disc 13 which is seated on the chuck yoke 81.

A carriage drive motor 96 and a helically threaded ball shaft 97 are supported on a frame 98. The ball shaft 97 cooperates with a ball shaft follower 99 associated with the head carriage.

In order to support the head arm 34, the head carriage 18 is provided with a head support stand 100. This stand 100 is connected with a support plate 101 by a curved plate spring.

Figure 16:
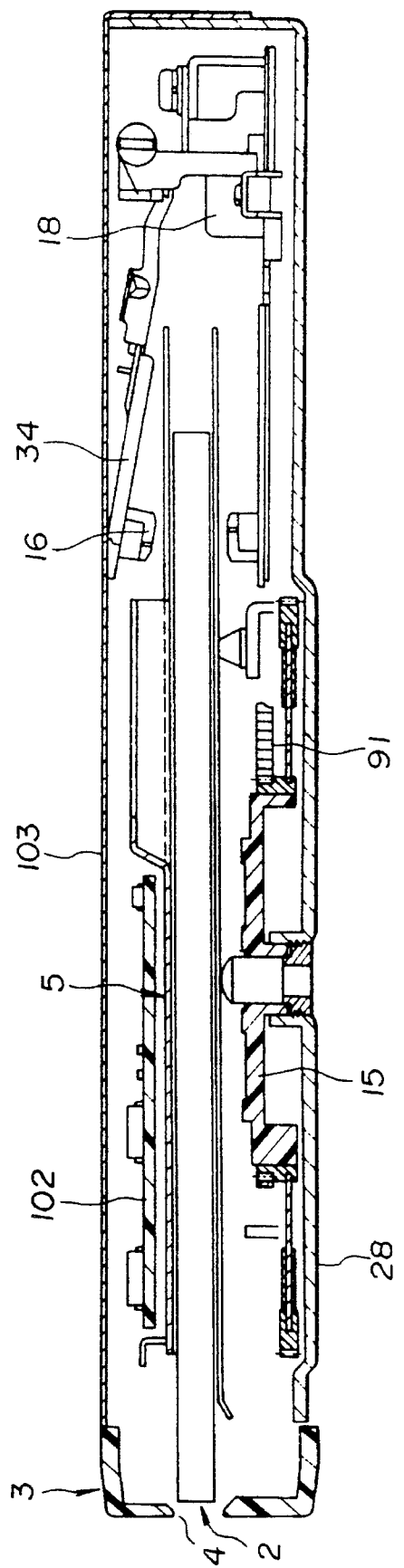
FIG. 16 is a side elevation, partially in section, which shows the disposition of a printed circuit board in the disc drive of the invention.

The head arm 34 is provided with the previously mentioned holder engagement portion 33 which engages the head drive element 32 of the cartridge holder 5. Accordingly, when the cartridge holder 5 rises to the loading/unloading position, the above mentioned support plate 101 moves upwardly whereby the head arm 34 assumes a raised condition as shown in FIG. 16, wherein the free end of the head arm projects above the upper surface 21 of the cartridge holder 5.

with this arrangement, as the printed circuit board which controls the operation of the drive motor 92 and the carriage drive motor 96, is located above the cartridge holder 5 when it is assumes its uppermost position, and the head arm is arranged to assume the above mentioned raised position, efficient use of the space within the drive unit is achieved and the dead space which tends to result with the prior art, is eliminated.

103 denotes a shield case which encloses the printed circuit board 102.

It will be appreciated, with the just described construction, as the distance between the top of the cartridge holder and the uppermost portion of the head arm is essentially the same as the thickness of the printed circuit board it is possible for the overall height of the disc drive to be reduced and thus enable a slimmer more compact arrangement.

OPERATION

The operation of the above described disc drive arrangement is such that when a disc cartridge 2 is inserted into the cartridge holder 5, when the disc cartridge 2 is partially inserted into the cartridge holder, the shutter control arm 6 engages in a slot formed in the leading edge of the disc cartridge and as further insertion takes place the shutter 7 of the disc cartridge 2 is moved to an open position. Upon entering the disc cartridge 5 by a predetermined amount, the leading edge of the disc cartridge 2 engages a portion of a lock lever 8 and induces the rotation of the same. This rotation releases a locking action which holds the slide plate 9 in a position wherein the cartridge holder 5 is maintained in the loading/unloading position. The slide plate 9 is then released and free to move under the influence of the return springs 10 and in a manner which draws the cartridge holder down and induces the situation wherein the disc hub of the disc enclosed in the disc cartridge 2, sits on a chuck yoke 81 of a turntable arrangement. Subsequent further downward displacement of the cartridge holder 5 allows the head 16 be pivoted downwardly to engage the upper surface of the disc with a predetermined force.

Upon the disc drive mechanism 17 being switched on, the motor 92 and cogged drive belt 91 induce the rotation of the chuck yoke 81 and the inertia increasing ring member which is press fitted onto the external periphery thereof.

Upon sufficient downward displacement of the cartridge holder 5 the head carriage is rendered operative.

When the eject button 64 is pressed, the slide plate 9 is moved in a manner which raises the cartridge holder 5 to the loading/unloading position against the bias of the return springs 10. When the cartridge holder assumes the loading/unloading position, the lock lever rotates and engages the slide plate in a manner which maintains the cartridge holder in said loading/unloading position.

EFFECT OF THE INVENTION

As will be appreciated from the above, the disc drive according to the present invention is such as to provide a mechanism for raising and lowering a cartridge holder, wherein the cartridge holder is formed by press working a single piece of sheet metal and cooperates with a slide plate which is similarly formed by press working a single piece of sheet metal. The sides of the guide slots formed in the slide plate are parallel and serve to guide horizontally projecting flange-like guide members of the cartridge holder which are formed during the press working. This eliminates the need for guide rollers and the complex shaped guide slots which tend to increase the amount of force which is required to induce ejection. This arrangement further simplifies the manufacture and reduces the amount of parts which must be assembled.

What is claimed is:

1. A disc drive comprising:

a cartridge holder into which a disc cartridge is insertable, said cartridge holder having a keyhole-shaped aperture with a circular portion and a straight slot portion formed therein;

means operatively interconnecting said cartridge holder with a chassis for selectively raising and lowering the disc cartridge with respect to the chassis; and a shutter control arm disposed in said cartridge holder, said shutter control arm having a shutter engaging member arranged at one end thereof and which is receivable in a recess formed in the leading edge of the disc cartridge which is inserted into the cartridge holder, said shutter control arm being arranged to respond to the force which is applied thereto by said disc cartridge to move in a manner which opens a shutter which is slidably mounted on the disc cartridge, wherein said shutter control arm has a rectangular projection at an end thereof opposite said shutter engaging member with a longer dimension of said rectangular projection orientated toward said shutter engaging member, said rectangular projection being slidably received by said straight slot portion to be rotatably maintained in said circular portion of said keyhole-shaped aperture formed in said cartridge holder, whereby said shutter control arm is pivotally mounted in said cartridge holder so as to pivot about said circular portion.

2. The disc drive as claimed in claim 1 wherein said shutter control arm is integrally formed as a single piece of plastic material.

* * * * *